United States Patent Office 3,523,752
Patented Aug. 11, 1970

3,523,752
PREPARATION OF CYANOGEN CHLORINE AND HYDROGEN CHLORIDE
William S. Durrell and Robert J. Eckert, Jr., Mobile, Ala., assignors to Geigy Chemical Corporation, Ardsley, N.Y., a corporation of New York
No Drawing. Filed Oct. 5, 1967, Ser. No. 672,966
Int. Cl. C01b 7/08
U.S. Cl. 23—154                                           7 Claims

ABSTRACT OF THE DISCLOSURE

Cyanogen chloride is prepared from hydrogen cyanide and chlorine in certain nonaqueous liquid organic media, the hydrogen chloride formed as a byproduct thus being isolated in a substantially anhydrous condition.

DETAILED DESCRIPTION

This invention pertains to improvements in the preparation of cyanogen chloride, a valuable chemical intermediate in the ultimate manufacture of chemotherapeutic agents, herbicides, dyes, brightener agents, synthetic resins, plastics, rubber, explosives and other materials.

A presently used commercial process for the preparation of cyanogen chloride is described in U.S. Pat. No. 3,197,273 in which chlorine and hydrogen cyanide are brought into contact under reactive conditions. The reaction is conducted under aqueous conditions and the hydrogen chloride formed as a byproduct is in the form of dilute aqueous hydrochloric acid, e.g., of 2 to 4% strength. In actual commercial practice, the amounts of hydrochloric acid generated are exceedingly large. Unfortunately this material can be neither safely discarded without creating a possible pollution hazard nor economically concentrated so as to provide a source of concentrated hydrochloric acid.

Recent innovations in the preparation of cyanogen chloride have provided several methods of overcoming this problem, chiefly through producing aqueous hydrochloric acid in a sufficient concentration to be immediately and economically usable.

The present invention provides an alternative solution to the problem in that the hydrogen chloride generated in the production of cyanogen chloride from hydrogen cyanide and chlorine is substantially anhydrous. As a result, not only can it be economically stored or converted into any desired concentration of hydrochloric acid, but it can also be used directly in other processes such as those specifically requiring anhydrous hydrogen chloride.

In accordance with the present invention, hydrogen cyanide and chlorine are brought into contact under reactive conditions in a nonaqueous polar organic liquid medium. The more common organic solvents are generally unsuitable in that they fail to satisfy a number of basic requirements. Thus the medium must be substantially inert to both reactants and products and must be one in which at least one, preferably both, of the reactants, namely chlorine and hydrogen cyanide, is soluble to the extent of at least about 2% by weight. Ideally the liquid medium will also be one in which hydrogen chloride is not overly soluble, preferably less so than the reactants. Suitable media include acid chlorides and acid anhydrides such as acetyl chloride and acetic anhydride, particularly chlorinated derivatives thereof such as trichloroacetyl chloride and trichloroacetic anhydride; trichloroacetonitrile; chlorinated benzenes such as monochlorobenzene, trichlorobenzene, chloronitrobenzene; trichloronitromethane and the like. With the class of chlorinated benzenes, a small amount, e.g., up to 1%, of stearyl trimethylammonium chloride may be advantageously added.

The process can be conducted either on a batchwise or continuous basis. A typical procedure involves first filling a reaction vessel with the particular nonaqueous organic medium employed and saturating this with chlorine. A solution of hydrogen cyanide in the same medium is then introduced into the reaction vessel, preferably below the liquid surface level, while chlorine gas is introduced at the bottom of the reactor. Ideally the reactor will also be fitted with an overhead scrubber, that is e.g., packed columns of conventional shapes, with additional solvent being introduced through the top of the scrubber. This scrubbing solvent captures and returns gaseous chlorine and hydrogen cyanide which may escape from the reaction mixture. Separation is thus facilitated and the exit gas from the scrubber comprises anhydrous hydrogen chloride in a concentration of 90% or more. The reaction medium may be drawn off, in portions if desired, and stripped of the cyanogen chloride, the reclaimed solvent then being recycled. Conventional precautions to maintain non-aqueous conditions are of course desirable.

The following examples of this process will serve to further typify the nature of this invention.

Example 1

A glass column 2.5 cm. x 100 cm., jacketed with circulating water at ambient temperatures, was filled to a level of about 90 cm. with trichloroacetyl chloride. Chlorine gas was introduced by means of a fritted glass sparger at the base of the column. When the solvent was saturated with chlorine, a 2% by weight solution of hydrogen cyanide in trichloroacetyl chloride was introduced at a rate of 15.3 ml./min. through a capillary at a point 10 cm. below the liquid surface level. The rate of chlorine introduction was held at 1.33 g./min. After allowing the mixture to equilibrate for two hours with drainoff as necessary to maintain liquid level in the column, gas chromatography of the overhead gases showed a composition of approximately 55% hydrogen chloride, 6 to 7% hydrogen cyanide, 17 to 25% chlorine and 20 to 22% cyanogen chloride. Analysis of the reaction mixture showed 2.5% cyanogen chloride (54% of theory) with only traces of hydrogen cyanide and hydrogen chloride.

In a similar run in which the reaction temperature was held at 15° C. rather than ambient temperature and the hydrogen cyanide solution was introduced 20 to 30 ml. below the surface, the following rates were used: 13.8 ml./min. of 1.86% by weight solution of hydrogen cyanide in trichloroacetyl chloride and 1.172 g./min. of chlorine. The overhead gases after 90 minutes showed 47 to 54% hydrogen chloride, 9 to 13% hydrogen cyanide, 20 to 25% chlorine and 15 to 20% cyanogen chloride. The reaction mixture contained 2.5 to 3.5% by weight of cyanogen chloride (60 to 85% of theory).

Example 2

Using apparatus described in Example 1 but substituting 0.4% stearyl trimethylammonium chloride in trichlorobenzene for trichloroacetyl chloride, and using the following rates, 15 ml./min. of a 1% solution of hydrogen cyanide and 0.54 g./min. of chlorine, the reaction mixture, after one hour, showed a concentration of 1.65% cyanogen chloride or 79% of theory. Only trace amounts of hydrogen cyanide were present.

Example 3

Using the apparatus described in Example 1, but substituting trichloroacetonitrile for trichloroacetyl chloride, and using the following rates, 4.26 ml./min. of a 14.4% weight by volume solution of hydrogen cyanide and 1.69 g./min. of chlorine, the reaction mixture after 30 minutes contained 6.8% of cyanogen chloride (34% of theory), only traces of hydrogen chloride and hydrogen cyanide, and 0.5% of chlorine. The overhead gases contained 45–55% hydrogen chloride, 6–8% chlorine, 20 to 25% cyanogen chloride and 15 to 22% hydrogen cyanide.

Example 4

To optimize recovery of hydrogen chloride, the apparatus of Example 1 is modified by the addition of an overhead scrubber. Using a 2.5 cm. x 60 cm. column packed with glass helices, a scrubber solvent feed of 13 to 21 g./min. of trichloroacetyl chloride and reactor feeds of 6.5 g./min. of a 4.45% by weight solution of hydrogen cyanide in trichloroacetyl chloride and 0.802 g./min. of chlorine, the exit gases had a composition of 88 to 92% hydrogen chloride with only 2 to 7% chlorine, 5 to 6% cyanogen chloride and trace amounts of hydrogen cyanide. The reaction mixture contained 2.2% cyanogen chloride or 90.2% of theory.

Similar improvements in separation are observed when the procedures of Examples 2 and 3 are conducted with a scrubber.

What is claimed is:

1. In the process wherein hydrogen cyanide and chlorine are allowed to coreact so as to yield cyanogen chloride and hydrogen chloride, the improvement which comprises bringing the hydrogen cyanide and chlorine into contact under reactive conditions in a non-aqueous polar organic liquid medium which is substantially inert to hydrogen cyanide, chlorine, cyanogen chloride and hydrogen chloride and in which at least one of hydrogen cyanide and chlorine is soluble to the extent of at least about 2% by weight and hydrogen chloride is less soluble than cyanogen chloride, whereby the hydrogen chloride formed escapes from said medium during the reaction as an exit gas and is recovered in a substantially anhydrous condition while said cyanogen chloride remains in said medium.

2. The process according to claim 1 wherein the liquid medium is trichloroacetonitrile.

3. The process according to claim 1 wherein the liquid medium is trichloroacetyl chloride.

4. The process according to claim 1 wherein the liquid medium is trichloroacetic anhydride.

5. The process according to claim 1 wherein the liquid medium is acetic anhydride.

6. The process according to claim 1 wherein the liquid medium is trichlorobenzene containing up to 1% stearyl trimethylammonium chloride.

7. The process according to claim 1 wherein the liquid medium is monochlorobenzene containing up to 1% stearyl trimethylammonium chloride.

References Cited

UNITED STATES PATENTS

| | | | |
|---|---|---|---|
| 1,779,984 | 10/1930 | Schmittnagel | 23—359 |
| 1,938,324 | 12/1933 | Dieterle | 23—359 |

FOREIGN PATENTS

| | | |
|---|---|---|
| 820,580 | 9/1959 | Great Britain. |
| 974,229 | 11/1964 | Great Britain. |

EDWARD STERN, Primary Examiner

U.S. Cl. X.R.

23—359